United States Patent
Tateno

(10) Patent No.: US 8,750,579 B2
(45) Date of Patent: Jun. 10, 2014

(54) IMAGE INFORMATION PROCESSING APPARATUS AND IMAGE INFORMATION PROCESSING METHOD

(75) Inventor: Tsuyoshi Tateno, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 282 days.

(21) Appl. No.: 13/451,278

(22) Filed: Apr. 19, 2012

(65) Prior Publication Data
US 2013/0083961 A1  Apr. 4, 2013

(30) Foreign Application Priority Data
Sep. 29, 2011  (JP) .................... 2011-214841

(51) Int. Cl.
*G06K 9/00* (2006.01)
(52) U.S. Cl.
USPC .......................... 382/118; 382/103
(58) Field of Classification Search
USPC ................. 382/103, 118, 165, 181
See application file for complete search history.

(56) References Cited

U.S. PATENT DOCUMENTS

| | | | |
|---|---|---|---|
| 2008/0288988 A1 | 11/2008 | Yabe | |
| 2009/0226046 A1* | 9/2009 | Shteyn | 382/118 |
| 2010/0328492 A1* | 12/2010 | Fedorovskaya et al. | 348/231.2 |
| 2011/0263946 A1* | 10/2011 | el Kaliouby et al. | 600/300 |
| 2013/0005443 A1* | 1/2013 | Kosta et al. | 463/25 |

FOREIGN PATENT DOCUMENTS

| | | |
|---|---|---|
| JP | H 11153977 | 6/1999 |
| JP | 2000-112610 | 4/2000 |
| JP | 2001-100888 | 4/2001 |
| JP | 2007-097047 | 4/2007 |
| JP | 2007097047 | 4/2007 |
| JP | 2008-288694 | 11/2008 |
| JP | 2010-026871 | 2/2010 |
| JP | 2010233143 | 10/2010 |
| JP | 2011-071795 | 4/2011 |
| JP | 2011129997 | 6/2011 |

OTHER PUBLICATIONS

Japanese Patent Application No. 2011-214841, First Office Action, mailed Jun. 26, 2012, (with English Translation).
Japanese Patent Application No. 2012-208278, First Office Action, mailed Aug. 27, 2013, (with English Translation).

* cited by examiner

Primary Examiner — Gregory F Cunningham
(74) Attorney, Agent, or Firm — Blakely, Sokoloff, Taylor & Zafman LLP

(57) ABSTRACT

According to one embodiment, a viewer image processing module detects facial image data on a viewer from a shot image signal obtained by shooting the viewer, a viewed program image processing module detects facial image data on a performer included in program data the viewer is viewing, and a synchronous control module creates viewer information that correlates facial image data on the performer, facial image data on the viewer, and program information on the program with one another and transmits the viewer information to a viewing data entry module.

10 Claims, 13 Drawing Sheets

Viewer image processing flow

Viewed program image processing flow

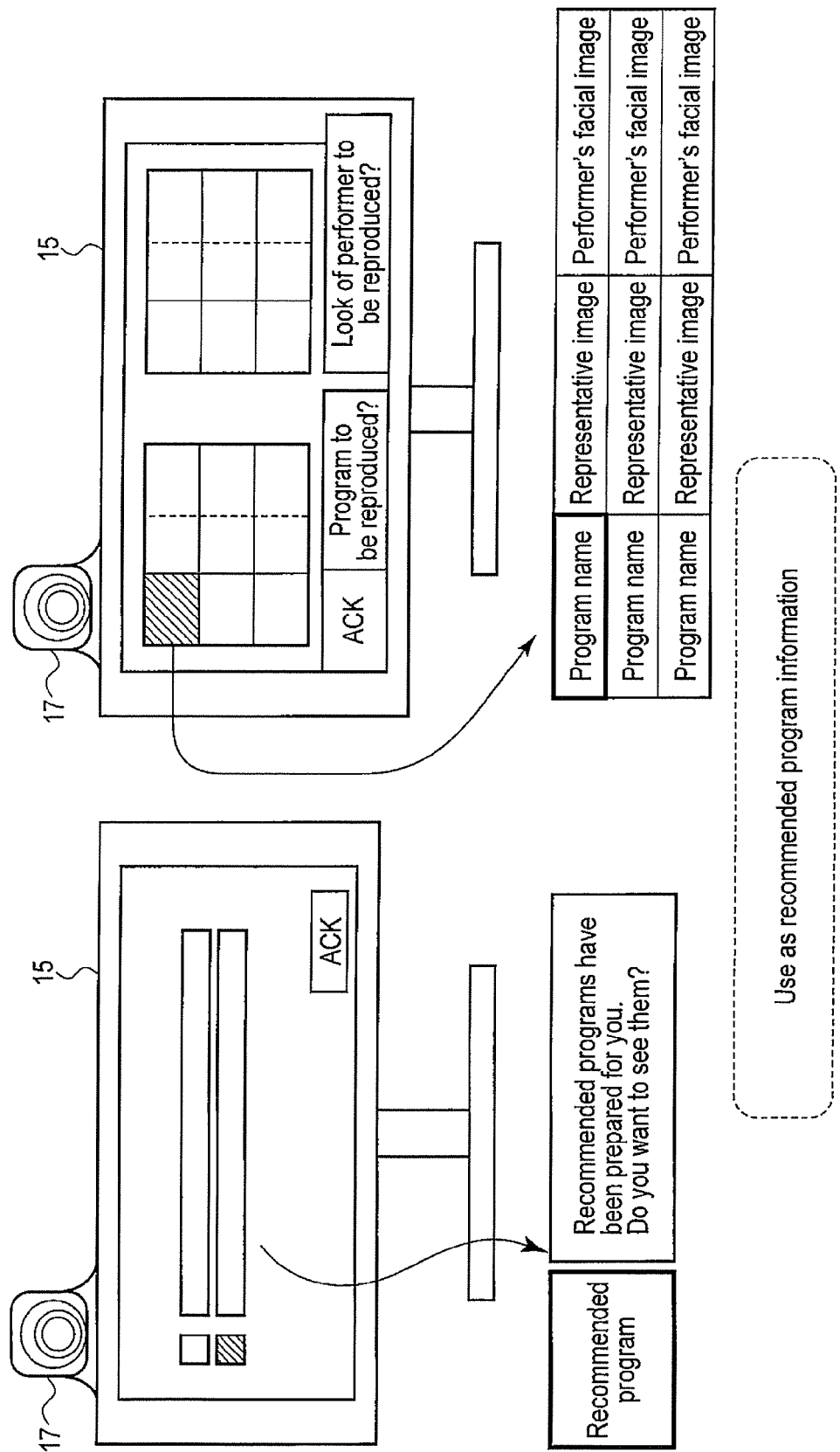
F I G. 10B
F I G. 10A

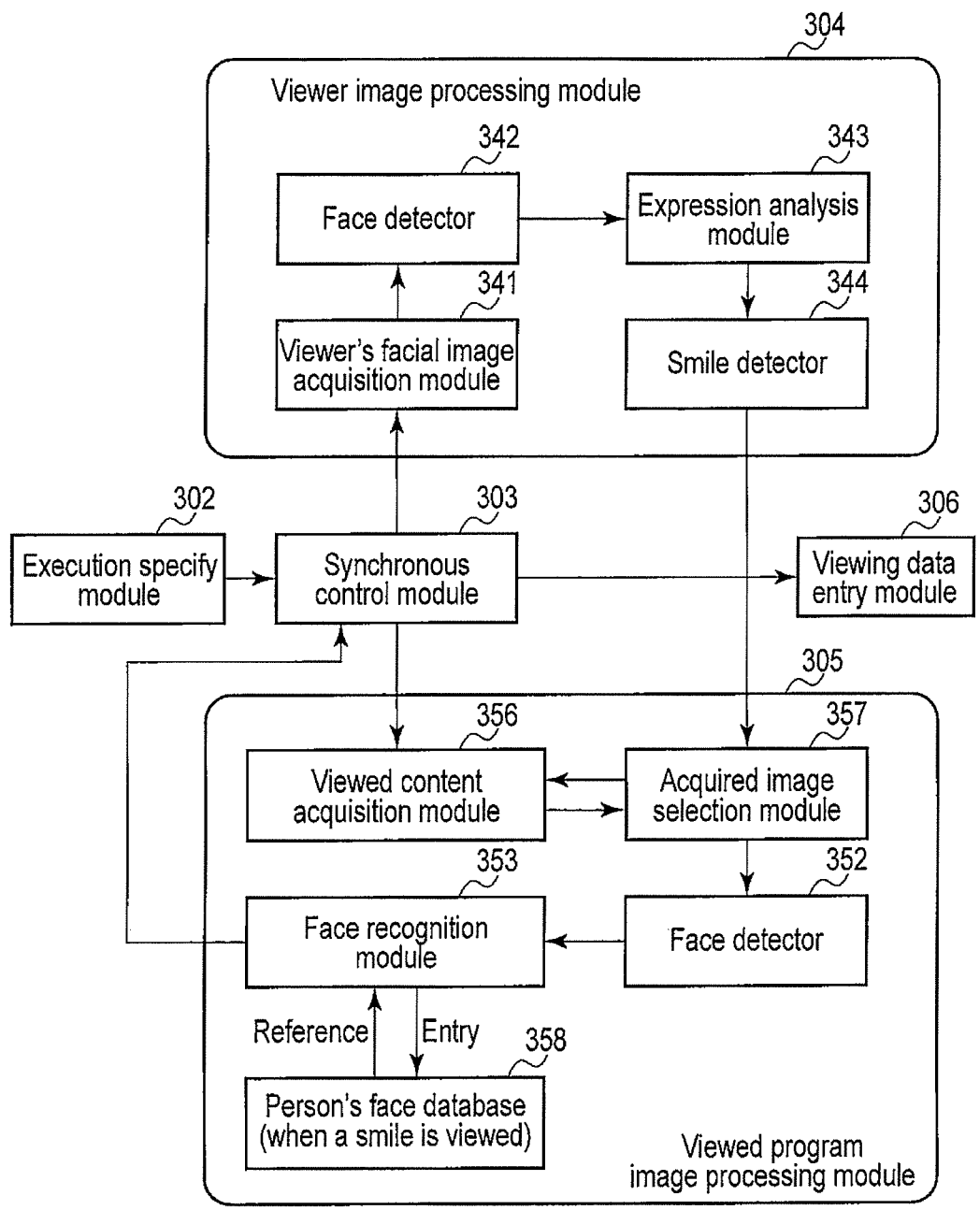
F I G. 12

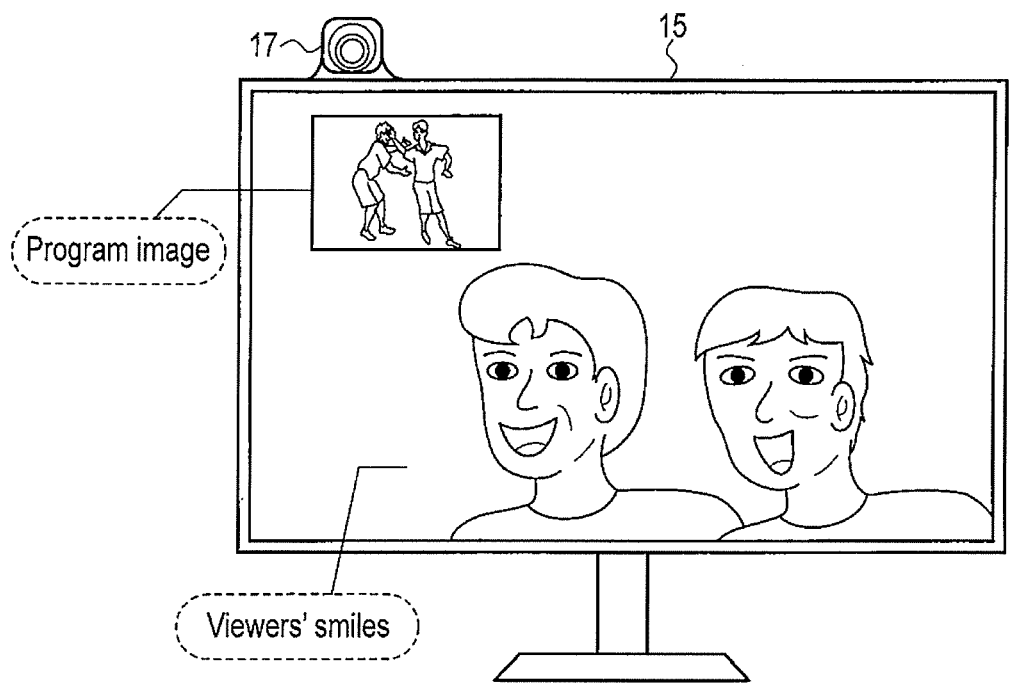
F I G. 14
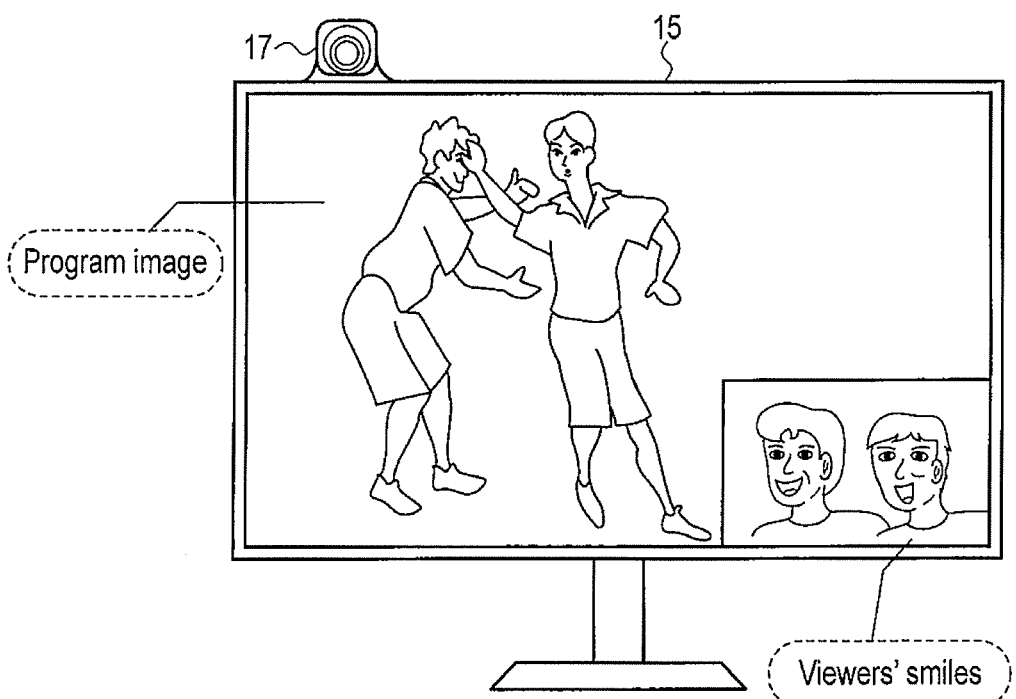
F I G. 15

IMAGE INFORMATION PROCESSING APPARATUS AND IMAGE INFORMATION PROCESSING METHOD

CROSS-REFERENCE TO RELATED APPLICATIONS

This application is based upon and claims the benefit of priority from prior Japanese Patent Application No. 2011-214841, filed Sep. 29, 2011, the entire contents of which are incorporated herein by reference.

FIELD

Embodiments described herein relate generally to an image information processing apparatus and an image information processing method.

BACKGROUND

There is an apparatus that determines image content a viewer might be interested in. The apparatus shoots a facial expression of a viewer while the viewer is viewing image content and infers the viewer's feelings and further infers the feelings of a performer from a facial expression of the performer in the image content. Then, the apparatus supposes that a scene where the feelings of the viewer coincide with those of the performer is a scene the viewer has sympathized with and stores the scene as a summary image in a specific storage area.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIGS. 10A and 10B are examples of the television receiving apparatus of the embodiment providing recommended program information to a viewer;

FIG. 12 is an exemplary block diagram of an objective image process 201 of FIG. 1 according to another embodiment;

FIG. 14 shows an example of images displayed on a display when a viewer response image file has been reproduced in the embodiment; and FIG. 15 shows another example of images displayed on the display when a viewer response image file has been reproduced in the embodiment.

DETAILED DESCRIPTION

Various embodiments will be described hereinafter with reference to the accompanying drawings.

The technique for correlating a specific scene of a TV program with a facial expression of a viewer has been developed and is required to be developed further.

In general, according to one embodiment, there are provided an image information processing apparatus and an image information processing method which are capable of making effective use of facial image data on a viewer, facial image data on a performer included in program data on a TV program, and program information.

According to an embodiment of the present disclosure, a viewer image processing module detects facial image data on a viewer from a shot image signal obtained by shooting the viewer; a viewed program image processing module detects facial image data on a performer included in program data the viewer is viewing; and a synchronous control module creates viewer information that correlates facial image data on the performer, facial image data on the viewer, and program information on the program with one another and transmits the viewer information to a viewing data entry module.

Figure 1:
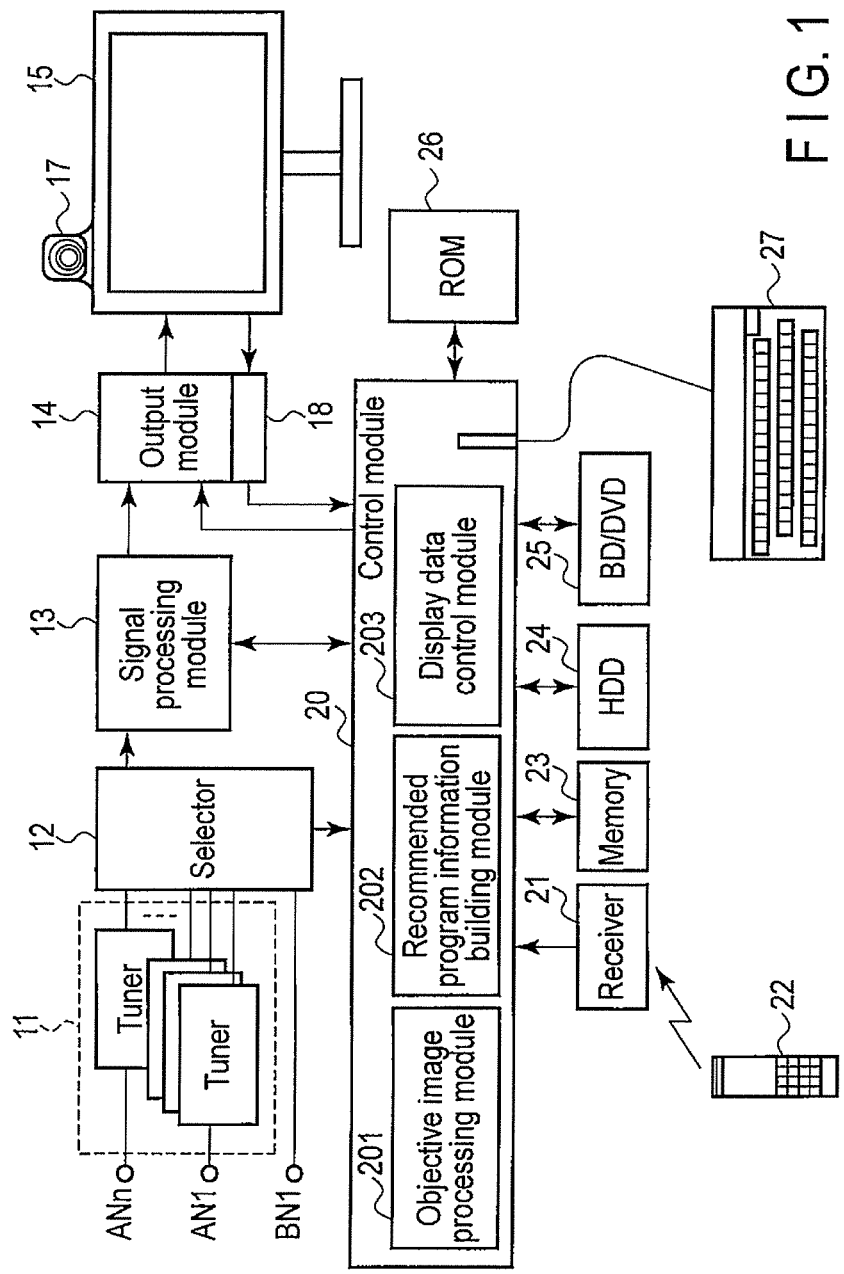
FIG. 1 shows an exemplary schematic configuration of a television receiving apparatus to which an embodiment has been applied.

Hereinafter, an embodiment will be explained with reference to the drawings. FIG. 1 shows a schematic configuration of, for example, a television receiving apparatus to which the embodiment has been applied. A data recording/reproducing apparatus may be used in place of the television receiving apparatus. Numeral 11 indicates a tuner device. A plurality of tuners been incorporated in the tuner device, which can receive a plurality of channels simultaneously and demodulate a plurality of broadcast programs. High-frequency signals received by an antenna are input to the tuner device 11 via input terminals AN1, . . . , Ann. An input terminal BN1 is an external input terminal. A signal from a cable, a network, or another device is input to the input terminal BN1.

A selector 12 selects a demodulated signal (stream signal) from the tuner device 11 or a signal from the input terminal BN1 under the control of a control module 20. The control stream selected by the selector 12 is input to the control module 20. The stream of a program signal selected by the selector 12 is input to a signal processing module 13.

The signal processing module 13 decodes a stream of, for example, a program to be viewed in the input stream of the program signal and outputs the decoded image signal to an output module 14. The output module 14 combines graphic image signals (including a program schedule (or a program table) image signal and a menu image signal) from the control module 20 with a program image signal. In addition, the output module 14 converts the size and scale of an image signal, processes the resolution of the image signal, and performs other processes. Then, the output module 14 outputs the resulting signal to a display 15.

The display 15 is provided with a camera 17. The camera 17 may be incorporated in the cabinet of the display 15. The camera 17 is for shooting a viewer who is viewing an image on the display 15. A shot image signal from the camera 17 can be loaded into the control module 20 via an interface 18. In addition, the shot image signal from the camera 17 can go from the control module 20, pass through the output module 14, and be monitored on the display 15. At this time, the user can set a shooting direction, a shooting area, and others by adjusting the shooting state of the camera 17. The setting may be done with a remote controller or by directly operating the operation module of the camera 17. The camera 17 may be installed so that its installation location can be changed variously.

The control module 20 supervises control of surrounding blocks connected to the module 20. A manipulated signal from a remote controller 22 is input to the control module 20 via a receiver 21, causing a user operation to be reflected on the whole apparatus.

A read-only memory (ROM) 26 is connected to the control module 20. In the ROM 26, various programs the control module 20 uses have been stored. A random access memory 23 is connected to the control module 20. The random access module 23 is used as a storage module for storing temporary data or as a developing module for programs to perform arithmetic processing. Further to the control module 20, a hard disk drive (HDD) 24 is connected. The HDD 24 is used as a medium to record and reproduce a program signal. Still further connected to the control module 20 is a BD/DVD drive 25. The DB/DVD drive 25 is also used as a medium to record and/or reproduce a program signal. In addition, a keyboard 27 can be connected to the control module 20 via a USB cable. In an operation mode, the user can input data (e.g., characters or graphic forms) by operating the keyboard 27, while viewing the display 15.

The control module 20 comprises an objective image processing module 201, a recommended program information building module 202, and a display data control module 203.

Figure 2:
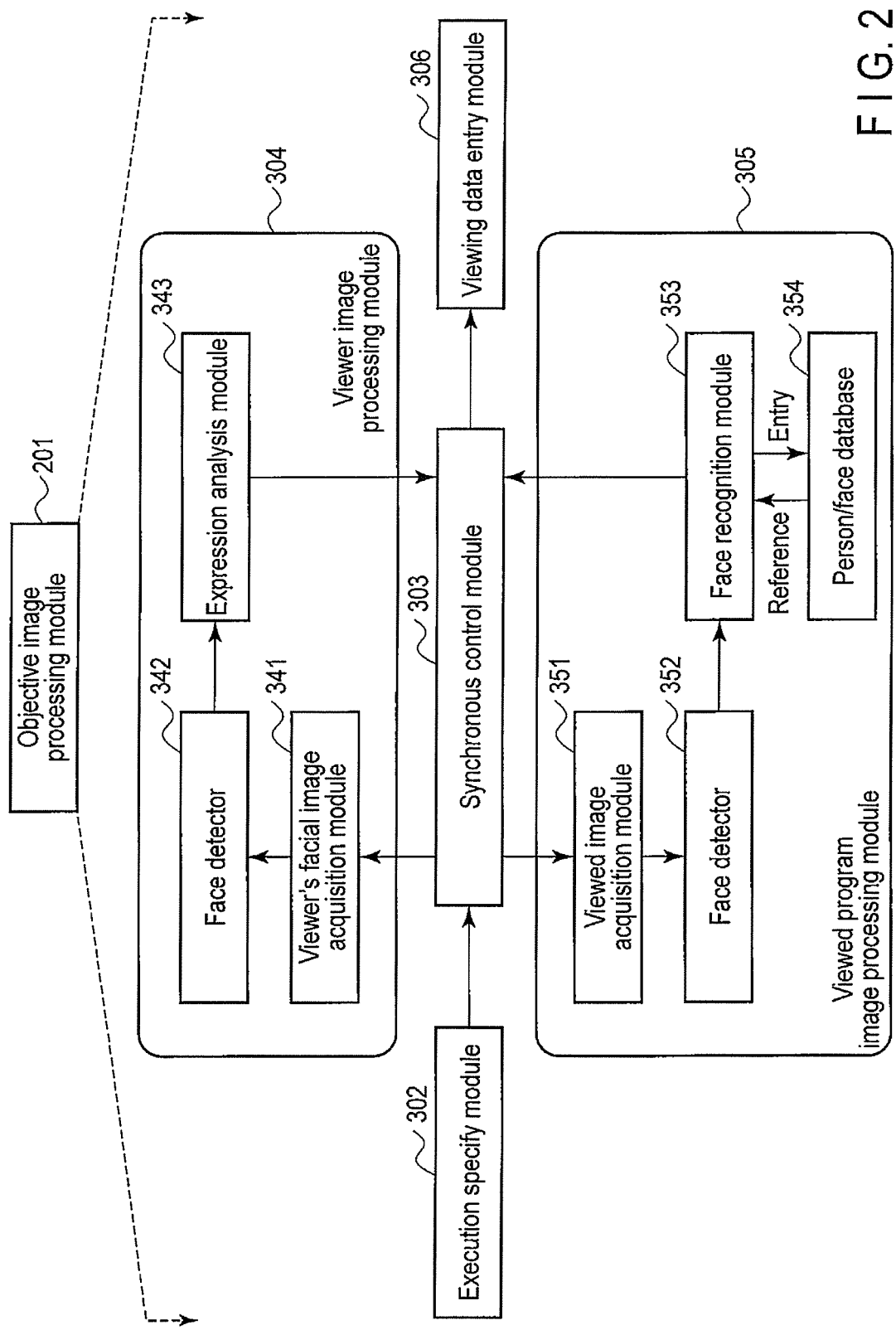
FIG. 2 is an exemplary block diagram of an objective image processing module 201 of FIG. 1.

FIG. 2 is a block diagram of the objective image processing module 201. Numeral 302 indicates an execution specify module for giving an instruction to operate the objective image processing module 201. When an execution operation signal is input to the execution specify module 302, a synchronous control module 303 is activated. The synchronous control module 303 starts up a viewer's facial image acquisition module 341. The viewer's facial image acquisition module 341 activates the camera 17 to take in a shot image of the viewer.

A face detector 342 detects a facial image signal from image signals obtained by shooting a viewer. The detected facial image signal is input to an expression analysis module 343. The expression analysis module 343 sets a plurality of points on a facial image (including eyes, a mouth, and cheeks) and monitors the movements (or moves) of the points as a frame time passes. The moves (extreme changes) of the points enables changes in the face (e.g., a smiling face, a crying face, or an angry face) to be detected. That is, the time when a change in the facial expression of the viewer has reached or exceeded a setting level is detected.

An analysis result signal from the expression analysis module 343 is input to the synchronous control module 303. The synchronous control module 303 determines an interval of a viewed image signal of a TV program corresponding to the analysis result signal has generated. That is, a viewed image signal is determined at the time point when the viewing viewer changes into a smile, for example, and the interval one to two minutes before and after the time point is determined.

The timing of the determination of the viewed image signal is not limited to the time point when the viewer changes into a smile. The viewed image signal may be determined periodically. In this case, the analysis result signal becomes a periodic timing signal.

Under the control of the synchronous control module 303, the viewed program image processing module 305 operates as follows. A viewed image acquisition module 351 takes in the viewed image signal which is the image signal during the one to two minutes before and after the time point when the viewer changes into a smile. A face detector 352 detects a facial image signal from the taken-in image signal of the program. The facial image signal almost always corresponds to a performer in a program the viewer has viewed. The face detector 352 detects a facial image signal form the image signal in the same manner as the face detector 342.

The facial image signal is input to a face recognition module 353. The face recognition module 353 makes a search to see if an image signal of a person (performer) corresponding to the recognized facial image signal is included in a database 354. If the search result has shown that the image signal of a person corresponding to the recognized facial image signal does not exist in the database 354, the face recognition module 353 determines the recognized facial image signal to be new information and informs the synchronous control module 303 that the module 353 has transmitted the facial image signal to the database 354 for entry. In contrast, if the image signal of a person (performer) corresponding to the recognized facial image signal exists in the database 354, the face recognition module 353 confirms the existence and notifies the synchronous control module 303 that the module 353 has determined the facial image signal.

Receiving the notice, the synchronous control module 303 can make a correlation of the program information the viewer is viewing, for example, a facial image signal of the viewer, and a facial image signal of a performer in the corresponding program. At this time, identification data may be added to each facial image signal. Then, it is possible to create a table that correlates the identification data of the viewer, for example, a facial image signal of the viewer, a facial image signal of the performer in the program, and program information the viewer is viewing to one another. The table is evaluated as viewer information as to which performer the viewer is interested in.

An image signal of a program to be processed by the objective image processing module 201 may be an image signal which, for example, the viewer is receiving and viewing and which is of a program currently being recorded. Alternatively, an image signal of a program to be processed by the objective image processing module 201 may be an image signal of a program that has already recorded on a recording medium and that is currently being reproduced and viewed by the viewer.

Figure 3:
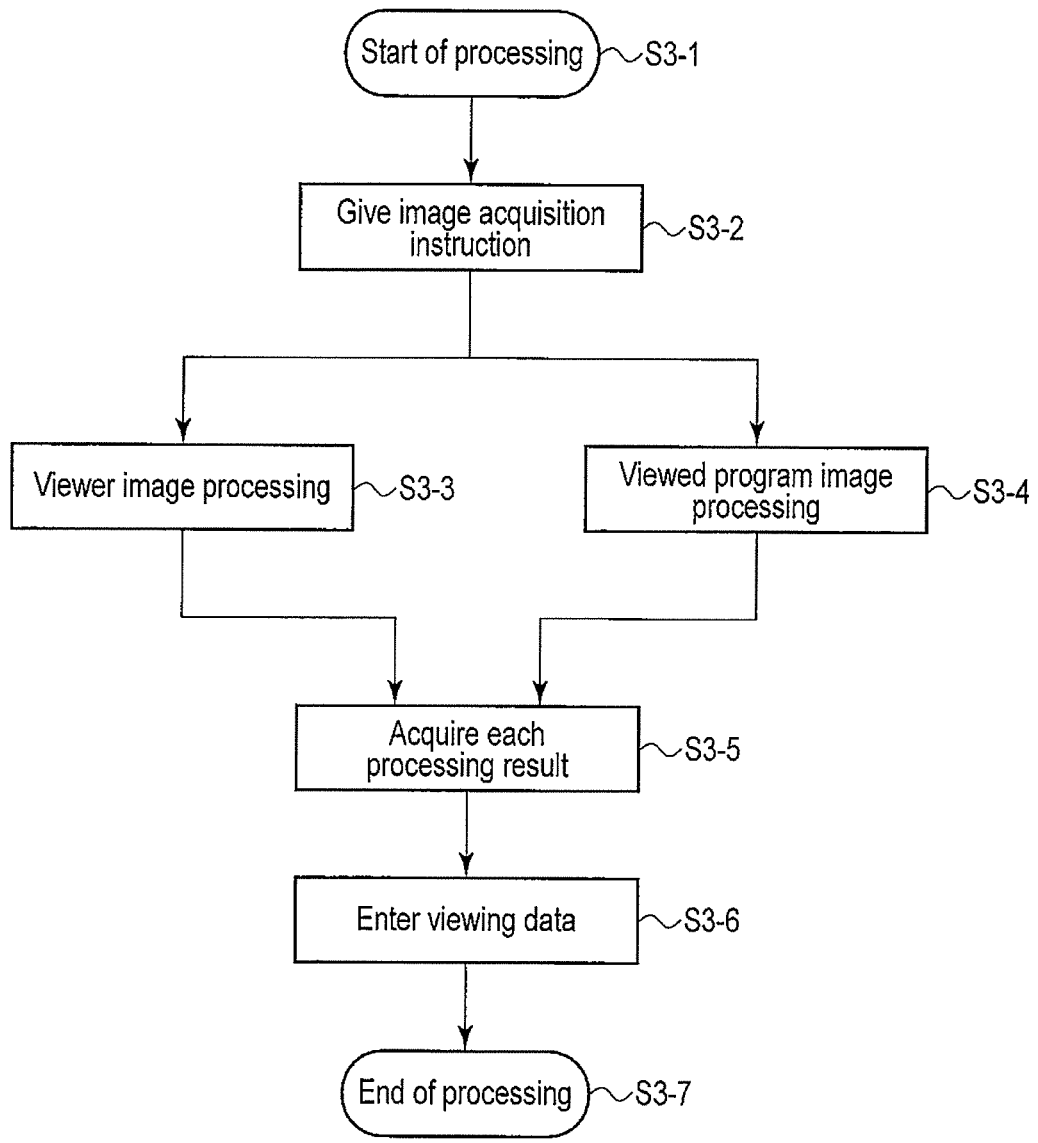
FIG. 3 is a flowchart to briefly explain the operations of a viewer image processing module 304 and a viewed program image processing module 305 shown in FIG. 2.

FIG. 3 is a flowchart to briefly explain the operations of the viewer image processing module 304 and viewed program image processing module 305. When having received an instruction to start processing from the execution specify module 302 (step S3-1), the synchronous control module 303 gives an image acquisition instruction to the viewer image processing module 304 and the viewed program image processing module 305 (step S3-2). The viewer image processing module 304 processes a shot image signal taken in from the camera 17 as described above and then processes a facial image signal of the viewer (step S3-3). The viewed program image processing module 305 proceeds to an image signal process of a program the viewer is viewing (step S3-4).

The synchronous control module 303 supervises the processing operations of the viewer image processing module 304 and viewed program image processing module 305. Having notices from the viewer image processing module 304 and viewed program image processing module 305 (step S3-5), the synchronous control module 303 can cause program information the viewer is viewing, for example, a facial image signal of the viewer, and a facial image signal of a performer in the corresponding program to correspond to one another. At this time, the synchronous control module 303 adds identification data to each facial image signal. Then, the synchronous control module 303 can create a table that correlates identification data, for example, a facial image signal of the viewer, a facial image signal of a performer in the corresponding program, and program information the viewer is viewing to one another (steps S3-6 and S3-7).

Figure 4:
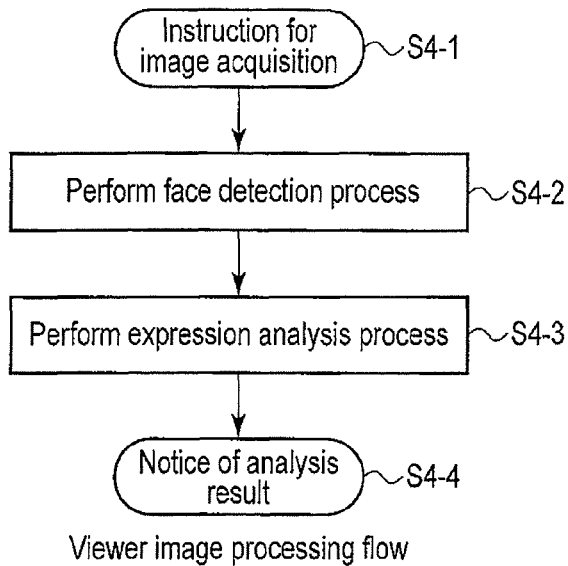
FIG. 4 is a flowchart to briefly explain the operation of the viewer image processing module 304 in the embodiment.

FIG. 4 is a flowchart to briefly explain the operation of the viewer image processing module 304. When the execution specify module 302 has given an instruction to acquire an image (step S4-1), the viewer image processing module 304 takes in an image of the viewer from the camera 17. Next, the viewer image processing module 304 performs a face detection process (step S4-2) and implements an expression analysis process using the detected facial image signal (step S4-3). Then, the viewer image processing module 304 informs the synchronous control module 303 of an expression analysis result signal.

Figure 5:
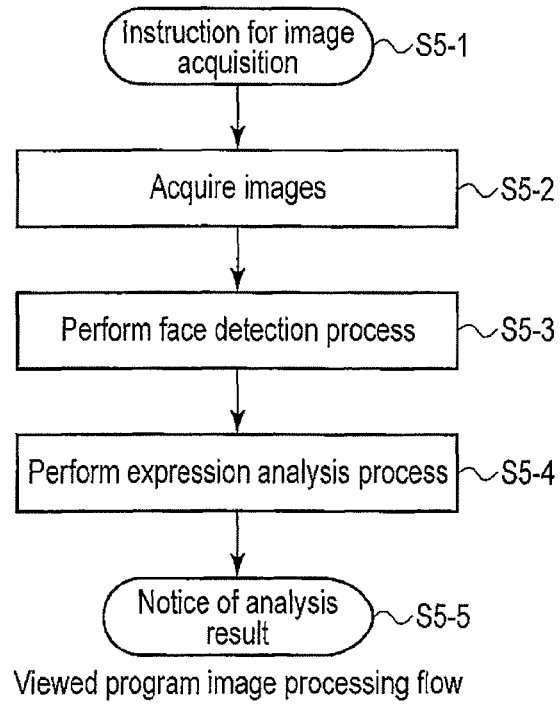
FIG. 5 is a flowchart to briefly explain the operation of a viewed program image processing module 305.

FIG. 5 is a flowchart to briefly explain the operation of the viewed program image processing module 305. Under the control of the synchronous control module 303, the viewed image acquisition module 351 takes in an image signal several seconds before and after the time when the module 351 was informed of the expression analysis result signal (step S5-1) (step S5-2). The face detector 352 detects a facial image signal from the taken-in program image signal (step S5-3). The viewed program image processing module 305 makes a search to see if an image signal of a person corresponding to the facial image signal acquired from the program signal is included in the database 354 (step S5-4). With the search, it is determined whether an image signal of the person corresponding to the recognized facial image signal exists in the database 354 (step S5-5).

As a result, the synchronous control module 303 receives notices from the viewer image processing module 304 and viewed program image processing module 305 as described above and can cause the program information the viewer was viewing, for example, a facial image signal of the viewer, and a facial image signal of a performer of the corresponding program to correspond to one another.

Figure 6:
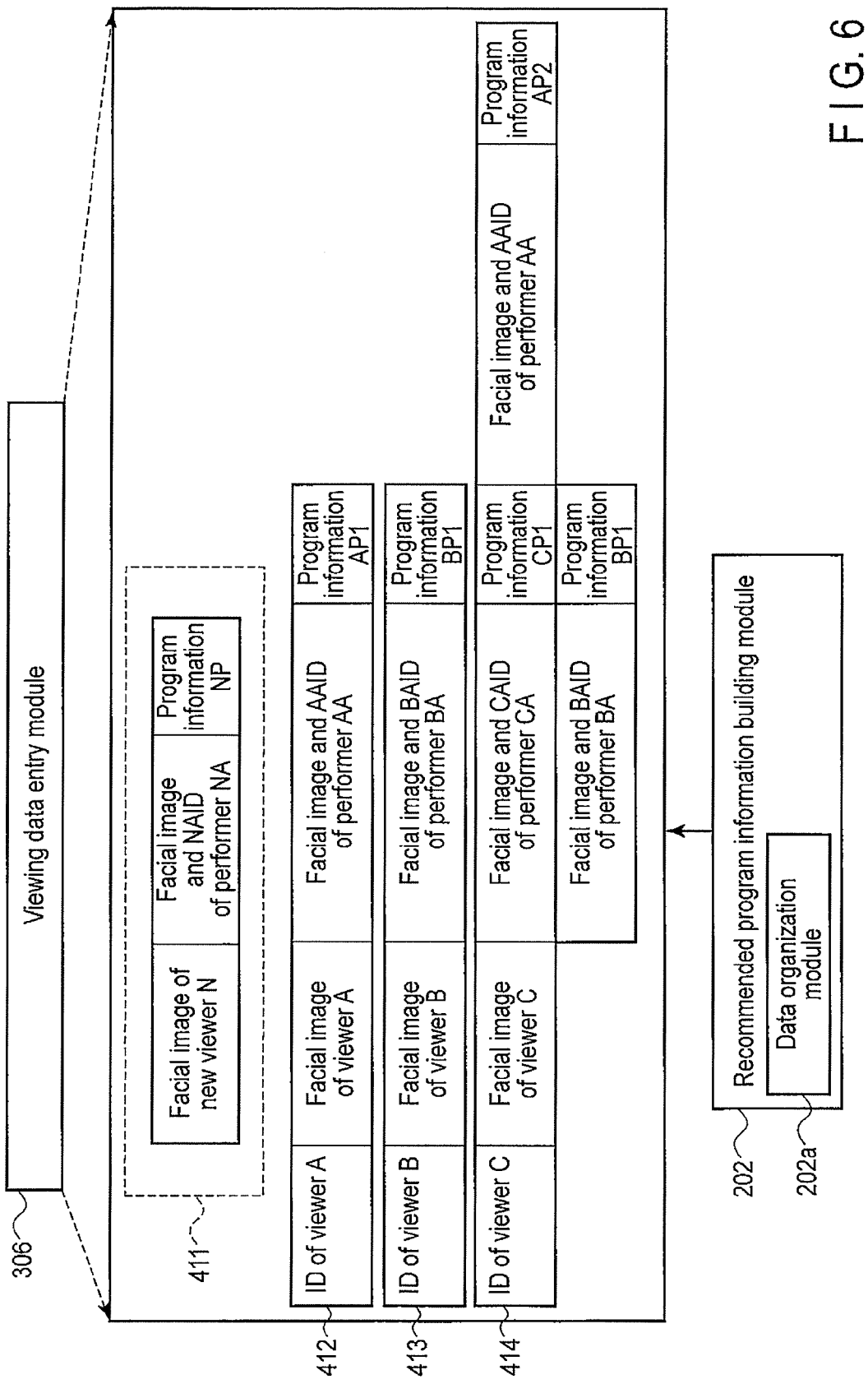
FIG. 6 shows an exemplary configuration of a database (viewer information) in a viewing data entry module 306.

FIG. 6 shows a configuration of a database (viewer information) in a viewing data entry module 306. Numeral 411 indicates a viewer information field for a newly taken-in viewer N. In this field, a facial image of a viewer N, a facial image of a performer NA appearing in a program NP viewed by the viewer N and a performer identifier NAID, and program information NP on the viewed program are written.

Numeral 412 indicates a viewer information field for viewer A, 413 indicates a viewer information field for viewer B, and 414 indicates a viewer information field for viewer C.

Suppose a facial image of viewer A, a facial image and identifier AAID of performer AA, and program information AP1 have been stored in the viewer information field 412. The viewer information in this field 412 means that performer AA appears in a program of program information AP1 and viewer A is interested in performer AA.

Suppose a facial image of viewer B, a facial image and identifier BAID of performer BA, and program information BP1 have been stored in the viewer information field 413. The viewer information in this field 413 means that performer BA appears in a program in program information BP1 and viewer B is interested in performer BA.

Suppose a facial image of viewer C, a facial image and identifier CAID of performer CA, and program information CP1 have been stored in the viewer information field 414. The viewer information in this field 414 means that performer CA appears in a program in program information CP1 and viewer C is interested in performer CA. In addition, in this viewer information, a facial image and identifier BAID of performer BA and program information BP1 have been stored. The information is the same as viewer information on viewer B, which means that viewer C is also interested in performer BA in which viewer B is interested. Suppose a facial image and identifier AAID of performer AA and program information AP2 have been also stored in viewer information on viewer C. This means that viewer C is interested in performer AA as viewer A is and that viewers A and C have got interested in performer AA as a result of viewing different TV programs.

The viewer information field 411 serving as a primary storage field is for a newly taken-in viewer N. In the viewer information field 411, a facial image of viewer N, a facial image and identifier NAID of performer NA appearing in program NP viewed by viewer N, and program information NP of the viewed program have been written.

However, it is necessary to check whether newly taken-in viewer information has to be entered in the viewer data entry module 306. This is because it is necessary to prevent redundant information from being built in the viewer data entry module 306. Redundant information is checked for by the data organization module 202a in the recommended program information building module 202.

Figure 7:
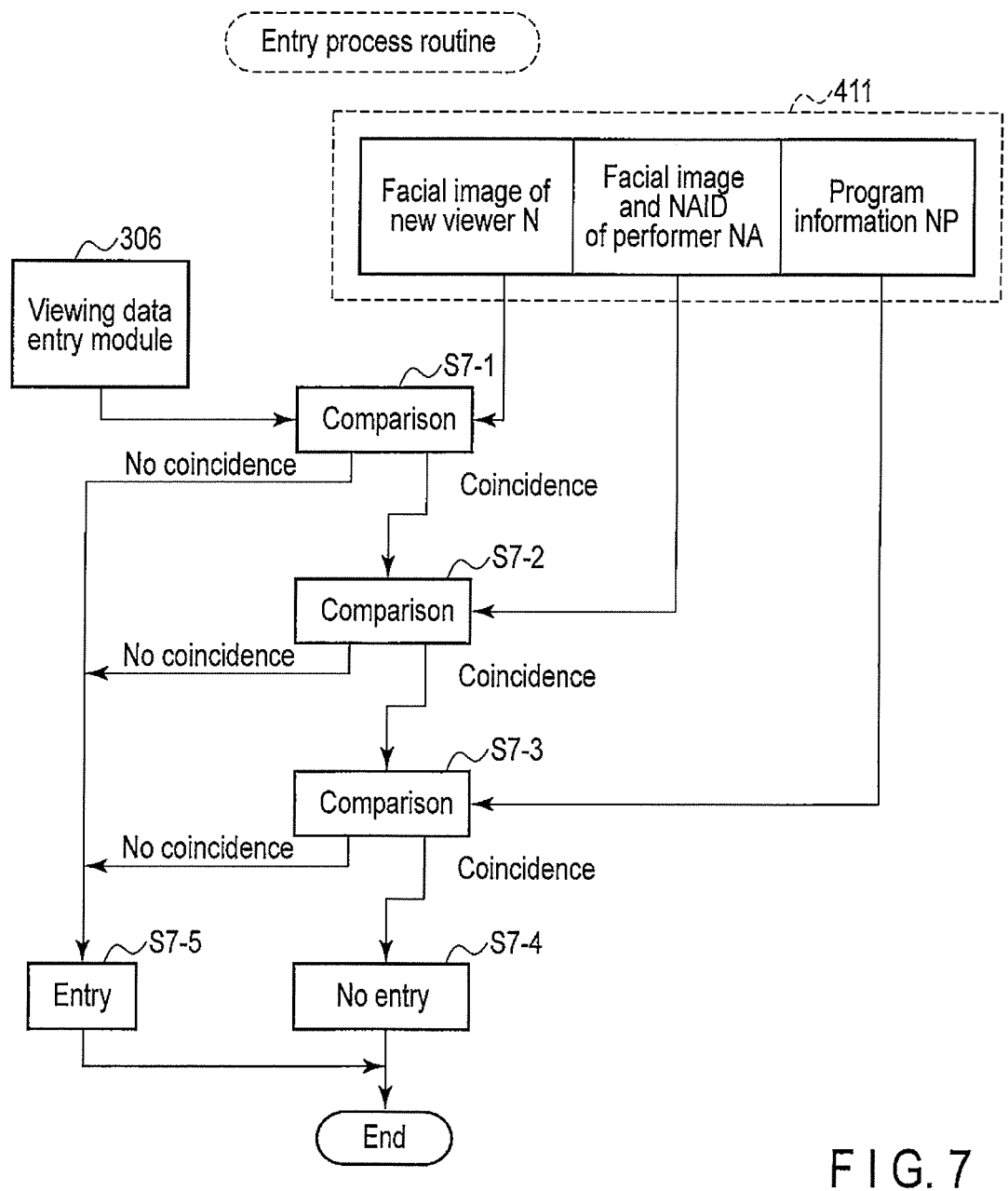
FIG. 7 shows an entry process routine executed by a data organization module 202a in a recommended program information building module 202 in the embodiment.

FIG. 7 shows an entry process routine executed by the data organization module 202a. The data organization module 202a is a processing routine to check whether viewer information has to be entered in the viewer data entry module 306.

A facial image of viewer N in the newly taken-in viewer information is compared with a facial image of a viewer already entered in the viewing data entry module 306 (step S7-1). If there is no entered facial image that coincides with the facial image of viewer N, an entry is made because the newly taken-in facial image is a facial image of a new viewer. Specifically, a field for the new viewer information is secured. In the field, a facial image of viewer N, a facial image and identifier NAID of performer NA appearing in a program (program information NP) viewed by viewer N, and program information NP on the viewed program are entered.

When there is an already entered facial image that coincides with the facial image of viewer N (e.g., N=C) in step S7-1, this means that viewer C has already been entered. In the next check (in step S7-2), a facial image and identifier NAID of performer NA are compared with a facial image and identifier of an already entered performer. If there is neither facial image nor identifier that coincides with those of the latter, this means that viewer C has viewed a program featuring a new performer. Then, the performer and program information at that time are entered in the program information field 414 of viewer C.

However, when there are a facial image and identifier of a performer that coincide with facial image and identifier NAID of performer NA (e.g., NA=AA, NAID=AAID), this means that a facial image and identifier of performer AA have already been included in viewer information on viewer C. Next, program information is checked (step S7-3). Specifically, it is determined whether new program information NP coincides with any piece of information on programs in which performer AA appears in viewer information on viewer C. Suppose that program information NP is NP=AP2 and that information on already entered programs in which performer AA appears is AP1. In this case, since the determination in step S7-3 has shown that the former does not coincide with the latter, program information A2 is entered (step S7-5). However, if the former program information coincides with the latter, this process is terminated without entry (step S7-4).

As described above, even if a facial image of viewer N, a facial image and identifier NAID of performer NA appearing in a program in program information NP viewed by viewer N, and program information NP on viewed programs have been newly acquired, they are compared with already entered information, thereby preventing double entry.

Figure 8:
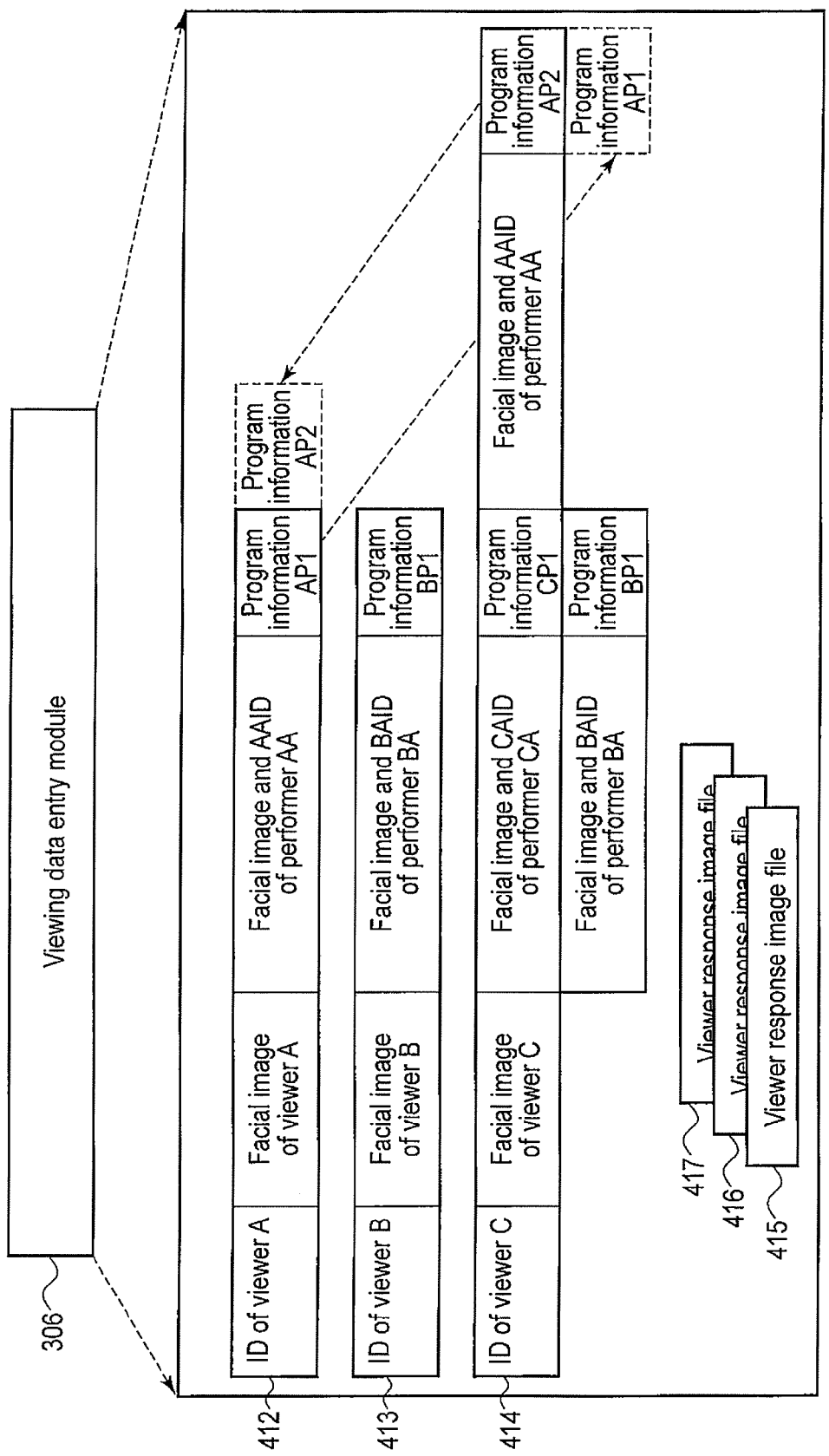
FIG. 8 is an exemplary diagram to explain the function of enriching recommended programs to each viewer in the viewing data entry module 306 of the embodiment.
Figure 9:
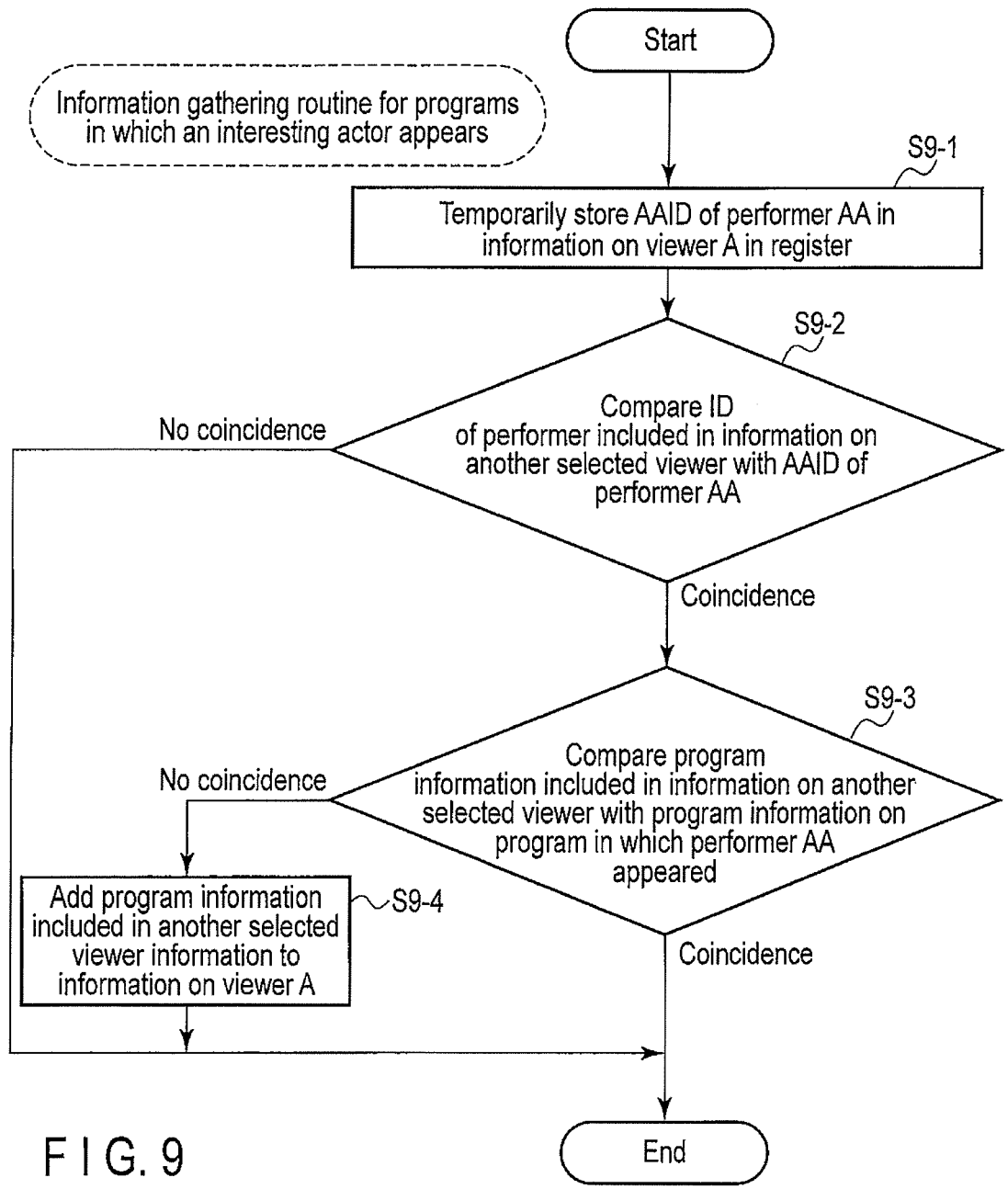
FIG. 9 is a flowchart to explain the function of enriching recommended programs to each viewer in the viewing data entry module 306 of the embodiment.

FIGS. 8 and 9 are diagrams to explain the function of enriching recommended programs to each viewer in the viewing data entry module 306.

As shown in an example of FIG. 8, suppose viewer A and viewer C are interested in the same actor (performer AA). Here, suppose viewer A has viewed a program in program information AP1 in which performer AA appeared and viewer C has viewed a program in program information AP2 in which performer AA appeared. In such a case, it is desirable that program information AP2 should be added also to viewer information on viewer A and program information AP1 should be added also to viewer information on viewer C.

FIG. 8 shows viewer response image files 415, 416, 417 in the viewing data entry module 306, which will be described later.

FIG. 9 is a flowchart to explain a processing routine to perform a viewer information editing process shown in FIG. 8. For example, a facial image and AAID of performer AA included in viewer information on viewer A are stored in a register (step S9-1).

Next, the facial image and AAID of performer AA are compared with a facial image and an identifier of each of the performers included in viewer information on the other viewers sequentially (step S9-2). If there is neither facial image nor identifier of a performer included in the viewer information on the other viewers which coincides with the facial image or AAID of performer AA, the comparison is terminated.

When there are a facial image and an identifier of a performer in the viewer information on the other viewers which coincide with the facial image and AAID of performer AA, control is shifted to the next check. In the examples of FIGS. 9 and 8, the facial image and AAID of performer AA included in viewer information on viewer A coincide with the facial image and AAID of performer AA included in viewer information on viewer C. This means that viewers A and C are interested in performer (actor) AA.

In step S9-3, program AP1 information included in viewer information on viewer A is compared with program information AP2 included in viewer information on viewer C. In this case, since program information AP1 does not coincide with program information AP2, program information AP2 is added to program information on viewer A in step S9-4.

When viewer information on viewer C is compared with viewer information on another viewer, this means that program information AP1 is not included in viewer information on viewer C. Therefore, program information AP1 is added to viewer information on viewer C.

The viewer information is effective in offering recommended programs. For example, it is possible to read viewer information on viewer A and display a face of a performer and program information (including a program name and a channel) on the display device.

FIGS. 10A and 10B show the way the television receiving apparatus 15 provides recommended program information to a viewer under the control of the display data control module 203. For example, suppose a viewer has operated a remote controller to request the television receiving apparatus 15 to display a menu. Then, as shown in FIG. 10A, "Recommended programs" is on the menu. By the menu item, a comment is displayed as follows: "Recommended programs have been prepared for you. Do you want to see them?"

When the viewer has selected "Recommended program" on the menu and operated an acknowledge (ACK) button, viewer information corresponding to the viewer is displayed as shown in FIG. 10B. For example, if the viewer is viewer C explained in FIG. 8, pieces of program information CP1, BP1, AB1, AP2 on programs in which performers CA, BA, and AA appeared who viewer C is interested in are displayed together with facial images of the performers in the individual programs. The viewer selects a program name the viewer wants to view by cursor operations and presses the ACK button, thereby starting the reproduction of the program.

The reason why a recommended program is provided for each viewer is as follows. When the viewer presses, for example, a menu button, the viewer is shot by the camera 17. The shot viewer's face is detected by a face detection module. The detected facial image is compared with a facial image a viewer already entered in the viewer data entry module to determine whether the same person exists in the entered facial images. If the same person (viewer) has been detected, the aforementioned item "Recommended programs" is displayed.

As described above, the viewer can acquire information on programs in which an actor appeared who the viewer is interested in from another piece of viewer information.

Figure 11:
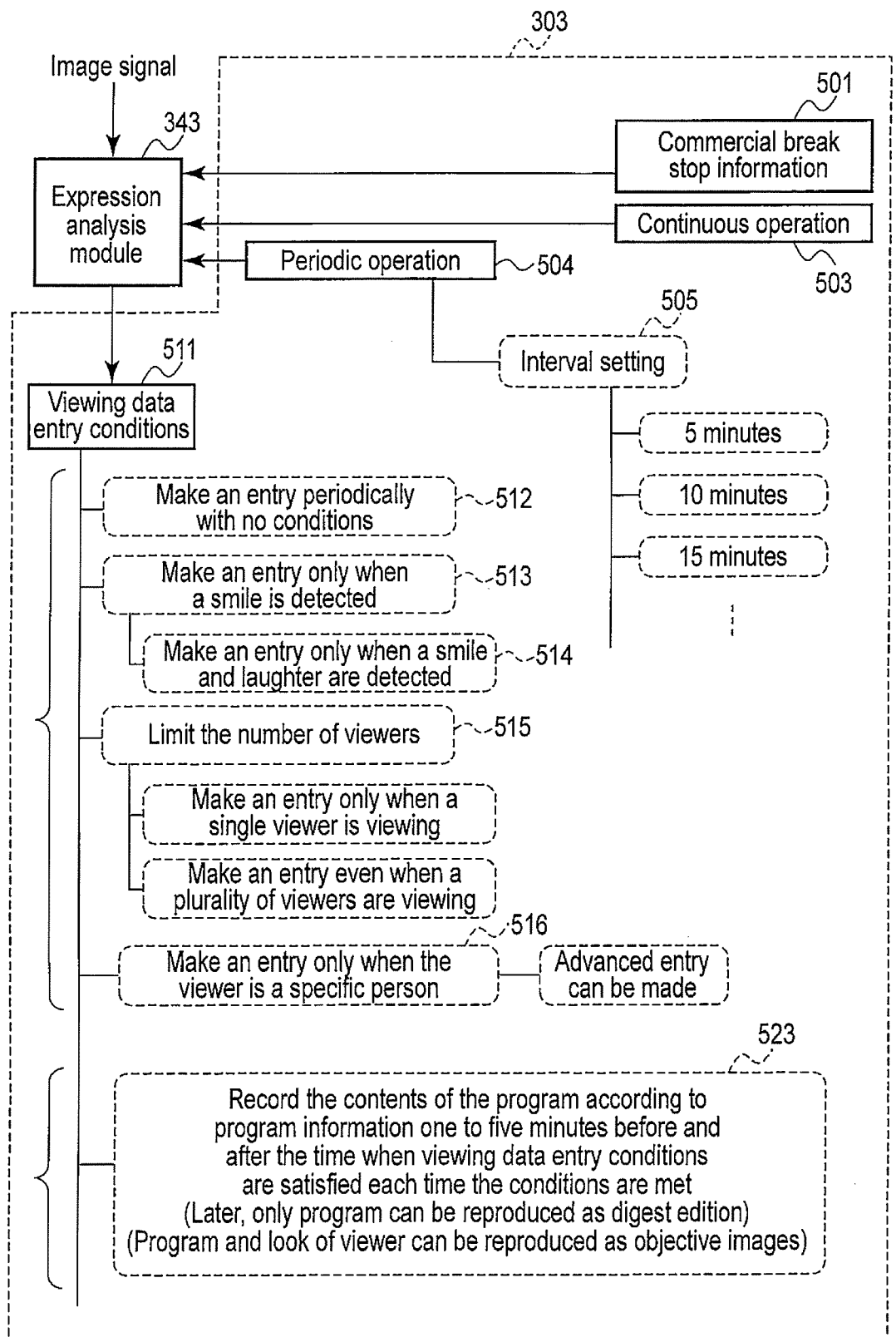
FIG. 11 is an exemplary diagram to explain various options when an expression analysis module 343 included in the embodiment sets a time for making an expression analysis.

FIG. 11 shows various options when the expression analysis module 343 sets a time to make an expression analysis. First, commercial break stop information 501 is given to the time when the expression analysis module 343 makes an expression analysis, which enables setting to be done so as to stop the commercial break. In addition, either continuous instruction information 503 for continuous operation or periodic execution instruction information 504 for periodic operation can be given as a period during which the expression analysis module 343 makes an expression analysis. When periodic execution instruction information 504 has been given to the expression analysis module 343, its interval information 505 (e.g., 5-minute interval, 10-minute interval, or 15-minute interval) can be set.

The commercial break stop information 501 may be supplied to the viewed program image processing module 305 or the viewed image acquisition module 351, the face detector 352, a face recognition module 353, and others in the viewed program image processing module 305.

In addition, when "viewer information" is entered in the viewing data entry module 306, conditions for entry may be set. First, condition setting 512 may be performed so as to enter viewer information periodically with no conditions. Viewer information is entered as explained in FIG. 7 to FIG. 9. In the next condition setting 513, the time when the viewer' smile is detected is set as an entry condition. At this time, laughter may be set as an item in condition setting 514 by detecting laughter.

Moreover, the number of viewers may be set as a data entry condition in condition setting. Either plural viewers or a single viewer may be specified when the number of viewers is used as an entry condition (condition setting 515). Alternatively, only when the viewer is a specific person may be set as an entry condition (condition setting 516). To achieve this, persons photographed by a camera are entered in advance, enabling the present viewer to be determined.

Furthermore, when viewing data is entered, the creation of a digest file that correlates program images with facial images of viewers may be set (condition setting 523).

FIG. 12 shows an embodiment that can set the creation of a digest file that correlates program images with facial images of viewers when viewing data is entered in the viewing data entry module. The same parts as the blocks shown in FIG. 2 are indicated by the same reference numerals.

In the objective image processing module 201, the viewer image processing module 304 has almost the same configuration as that shown in FIG. 2. The expression analysis module 343 sets a plurality of points on a facial image (including eyes, a mouth, and cheeks) and monitors the movements (or moves) of the points as a frame time passes. Information on the moves (extreme changes) of the points is input to a smile detector 344. The smile detector 344 can detect a smile from information on changes in the face.

The smile detection signal is input to an acquired image selection module 357 of the viewed program image processing module 305. The acquired image selection module 357, which controls a viewing content acquisition module 356, acquires content at the time when the viewer's smile was detected and one to two minutes before and after the time. In addition, the face detector 352 detects a facial image of a person from the acquired content. The facial image signal almost always corresponds to a performer in a program the viewer viewed. The face detector 352 detects a facial image signal from the image signal in the same manner as the face detector 342.

The facial image signal is input to a face recognition module 353. The face recognition module 353 makes a search to see if an image signal of a person (performer) corresponding to the recognized facial image signal is included in a database 354. If the search result has shown that an image signal of a person corresponding to the recognized facial image signal does not exist in the database 354, the face recognition module 353 determines the recognized facial image signal to be new information, enters the new information in the database 354, and informs the synchronous control module 303 that the new information has been entered. However, if an image signal of a person (performer) corresponding to the recognized facial image signal exists in the database 354, the face recognition module 353 checks the existence and notifies the synchronous control module 303 that the person has been determined.

Having received the notice, the synchronous control module 303 can create a digest file (or also referred to as a viewer response image file) that causes program information the viewer was viewing, a facial image signal of the viewer for, for example, several tens of seconds, a facial image signal of a performer in the corresponding program, and an image signal of the program to correspond to one another.

Figure 13:
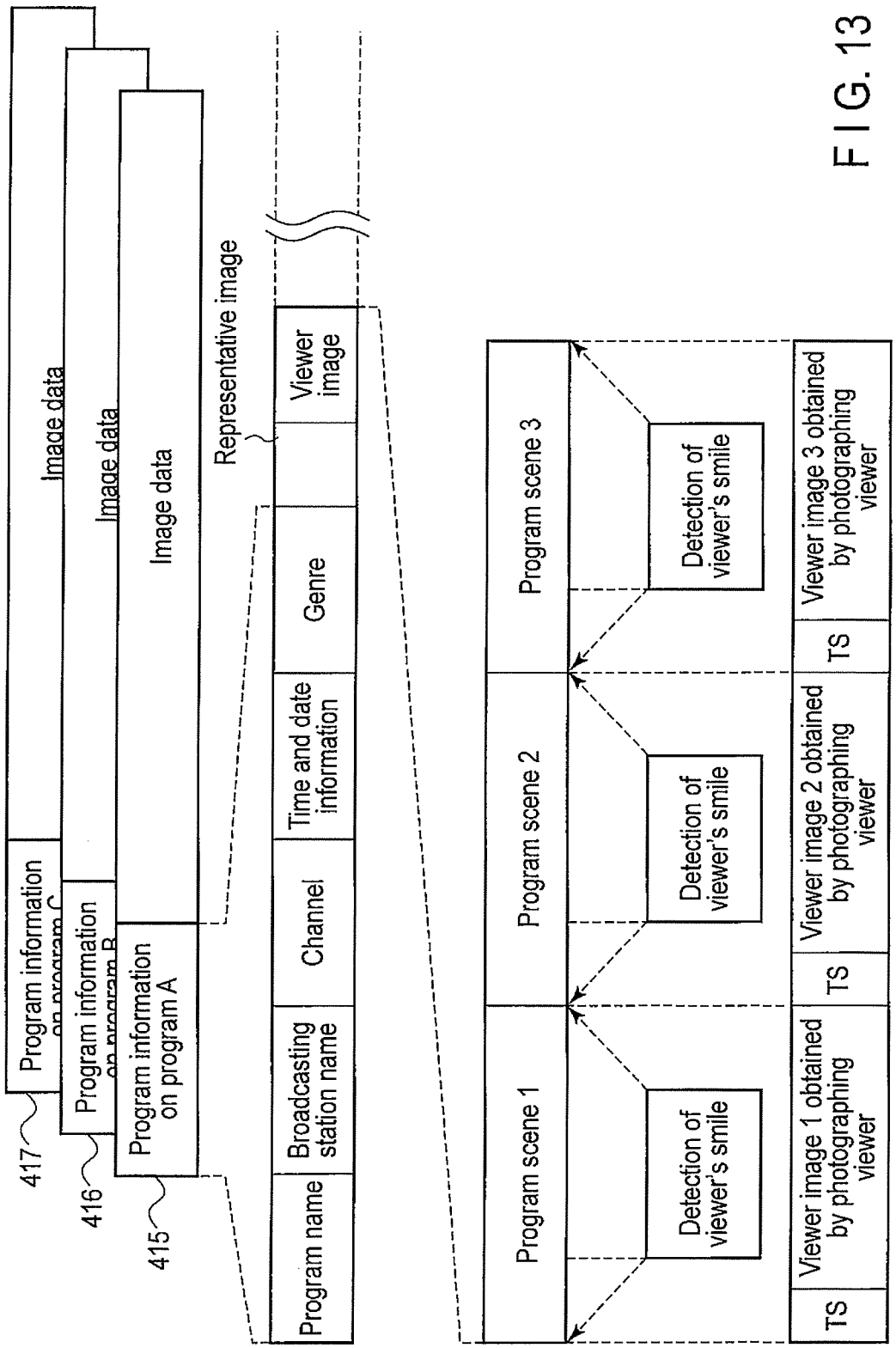
FIG. 13 shows a data configuration of a digest file that causes a viewer's facial image signal, a facial image signal of a performer in the corresponding program, and an image signal of the program to correspond to one another in the embodiment.

FIG. 13 shows a data configuration of a digest file that causes a facial image signal of the viewer, a facial image signal of a performer in the corresponding program, and an image signal of the program to correspond to one another. These files, which are the viewer response image files 415, 416, 417 shown in FIG. 8, are stored in a recording area of a recording medium, such as an HDD, constituting the viewing data entry module 306.

For example, viewer information (which may be referred to as a viewer information file in this embodiment) on program A includes a field for program information (including a program name, a broadcasting station name, a channel, recording time and date information, and a genre) on program A and a field for image data. The field for image data includes, for example, a representative image (or a facial image of a performer) of the program, a field of a facial image of the viewer, and a sampling image field.

In the sampling image field, the time when the viewer's smile was detected, images of the viewer photographed in an interval of about one to five minutes before and after the time, and images of scenes of a program corresponding to the interval are recorded in such a manner that the time and the images make a pair. In FIG. 13, images in the intervals of scene 1, scene 2, and scene 3 of the program are stored as sampling images. A time stamp TS indicating a relative time of the program may be written at the beginning of the viewer image data corresponding to each of scenes 1, 2, 3.

FIGS. 14 and 15 show examples of images displayed on a display when the viewer response image file has been reproduced under the control of the display data control module 203. The user can display, for example, a recording list on the display 15. The recording list is managed by the control module 20. The recording list includes viewer response image files 415, 416, 417. The user can select a desired file by operating a remote controller and operate a reproduce button. For example, suppose the user reproduces the viewer response image file 415. Then, scenes 1, 2, 3 of the program shown in, for example, FIG. 13 are reproduced sequentially. At the same time, images of the viewer are reproduced accordingly. A selection button enables either a scene of the program or an image of the viewer to be displayed in an inset manner.

When an image of the viewer is reproduced, the embodiment is not limited to what has been described above. For example, while program A is being reproduced continuously from the beginning, the display format may be changed to that of FIG. 14 or FIG. 15 at the time of scene 1, scene 2, or scene 3. Since each of the viewer images 1, 2, 3 includes a time stamp TS, the viewer images 1, 2, 3 can be reproduced in synchronization with the reproduction of scenes 1, 2, 3 in the course of reproducing program A. To achieve this reproduction, a reproduce mode selection button is configured to enable simultaneous reproduction of viewer response image files to be selected. The terms used in the above explanation are not limited to what they have been referred to as. They may be called differently, provided that they can realize equivalent functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An image information processing apparatus comprising:
   a viewer image processing module configured to detect facial image data on a viewer from a shot image signal obtained by shooting the viewer;
   a viewed program image processing module configured to detect facial image data on a performer included in program data the viewer is viewing; and a synchronous control module configured to create viewer information that correlates facial image data on the performer, facial image data on the viewer, and program information on the program with one another, and to transmit the viewer information to a viewing data entry module.

2. The image information processing apparatus of claim 1, wherein the acquisition of facial image data on the performer, facial image data on the viewer, and program information on the program, and the creation of viewer information that correlates these pieces of data and information with one another under the control of the synchronous control module are performed periodically.

3. The image information processing apparatus of claim 2, wherein the acquisition of facial image data on the performer, facial image data on the viewer, and program information on the program under the control of the synchronous control module is prevented during a commercial break in the program.

4. The image information processing apparatus of claim 1, further comprising a recommended program information building module configured to compare newly created new viewer information with stored viewer information entered in the viewing data entry module, to discard information in the new viewer information that overlaps with the stored information, and to store and enter information in the new viewer information that does not overlap with the stored information.

5. The image information processing apparatus of claim 4, further comprising a display control module configured to output facial image data on the performer, facial image data on the viewer, and program information on the program in the form of a recommended program list, on a display.

6. The image information processing apparatus of claim 1, wherein the viewer image processing module is configured to detect that a change in the facial expression of the viewer is equal to or higher than a setting level by use of facial image data on the viewer, and
the synchronous control module is configured to correlate facial image data on the performer, facial image data on the viewer, and program information on the program with one another and to transmit the correlated data and information to the viewing data entry module when that a change in the facial expression of the viewer is equal to or higher than a setting level is detected.

7. The image information processing apparatus of claim 5, wherein the synchronous control module is configured to store, in a viewer response image file, not only facial image data on the performer, facial image data on the viewer, and program information on the program but also data on the program at the time when that a change in the facial expression of the viewer is equal or higher than a setting level is detected and several minutes before and after the time, and data on an image of the viewer obtained by photographing the viewer.

8. The image information processing apparatus of claim 7, further comprising a display data control module configured to access the viewer response image file and to output data on the program and data on the viewer image as synchronous images on a display.

9. An image information processing method comprising;
causing a viewer image processing module to detect facial image data on a viewer from a shot image signal obtained by shooting the viewer and further to detect that a change in the facial expression of the viewer is equal to or higher than a setting level by use of the facial image data;
causing a viewed program image processing module to detect facial image data on a performer included in program data the viewer is viewing;
causing a synchronous control module to create viewer information that correlates facial image data on the performer, facial image data on the viewer, and program information on the program with one another and to transmit the viewer information to a viewing data entry module, when that a change in the facial expression of the viewer is equal to or higher than a setting level is detected; and
causing a recommended program information building module to compare newly created new viewer information with stored viewer information entered in the viewing data entry module, discard information in the new viewer information that overlaps with the stored information, and to store and enter information in the new viewer information that does not overlap with the stored information.

10. The image information processing method of claim 9, wherein the detecting facial image data on the performer and detecting facial image data on the viewer are prevented during a commercial break in the program.

* * * * *